United States Patent

Knausenberger

[15] 3,702,078

[45] Nov. 7, 1972

[54] DYNAMICALLY STABILIZED ACCELEROMETER AND RATE GYRO DEVICE

[72] Inventor: George E. Knausenberger, Annandale, Va.

[73] Assignee: The United States of America as represented by the Secretary of the Air Force

[22] Filed: Nov. 22, 1971

[21] Appl. No.: 201,079

[52] U.S. Cl. .................................. 73/504, 74/5.6
[51] Int. Cl. ..................... G01p 9/00, G01c 19/28
[58] Field of Search .............. 73/504; 74/5.6; 33/226

[56] References Cited

UNITED STATES PATENTS

| | | | |
|---|---|---|---|
| 2,985,023 | 5/1961 | Weiss et al. | 74/5.34 |
| 3,296,870 | 1/1967 | Turnblade et al. | 73/504 |

*Primary Examiner*—Richard C. Queisser
*Assistant Examiner*—Herbert Goldstein
*Attorney*—Harry A. Herbert, Jr. et al.

[57] ABSTRACT

A gyroscopic device having a rotor, supported in a liquid within a chamber, with the speed of the chamber being changed cyclically by varying the speed of a synchronous motor. The speed of the synchronous motor is changed by varying the output frequency of an oscillator which drives the motor through a power amplifier. Rate gyro information and acceleration information by means of a photoelectric pickup device with the change of position of the illumination spot being used to provide a pair of rate signals in a pair of difference circuits. A change in spot size is used to provide an acceleration signal in the output of a summing circuit. Gates in the output of the difference circuits and summing circuits are operated by the same cam that controls motor speed to close the gates during different portions of the speed change cycle.

4 Claims, 6 Drawing Figures

INVENTOR.
GEORGE E. KNAUSENBERGER

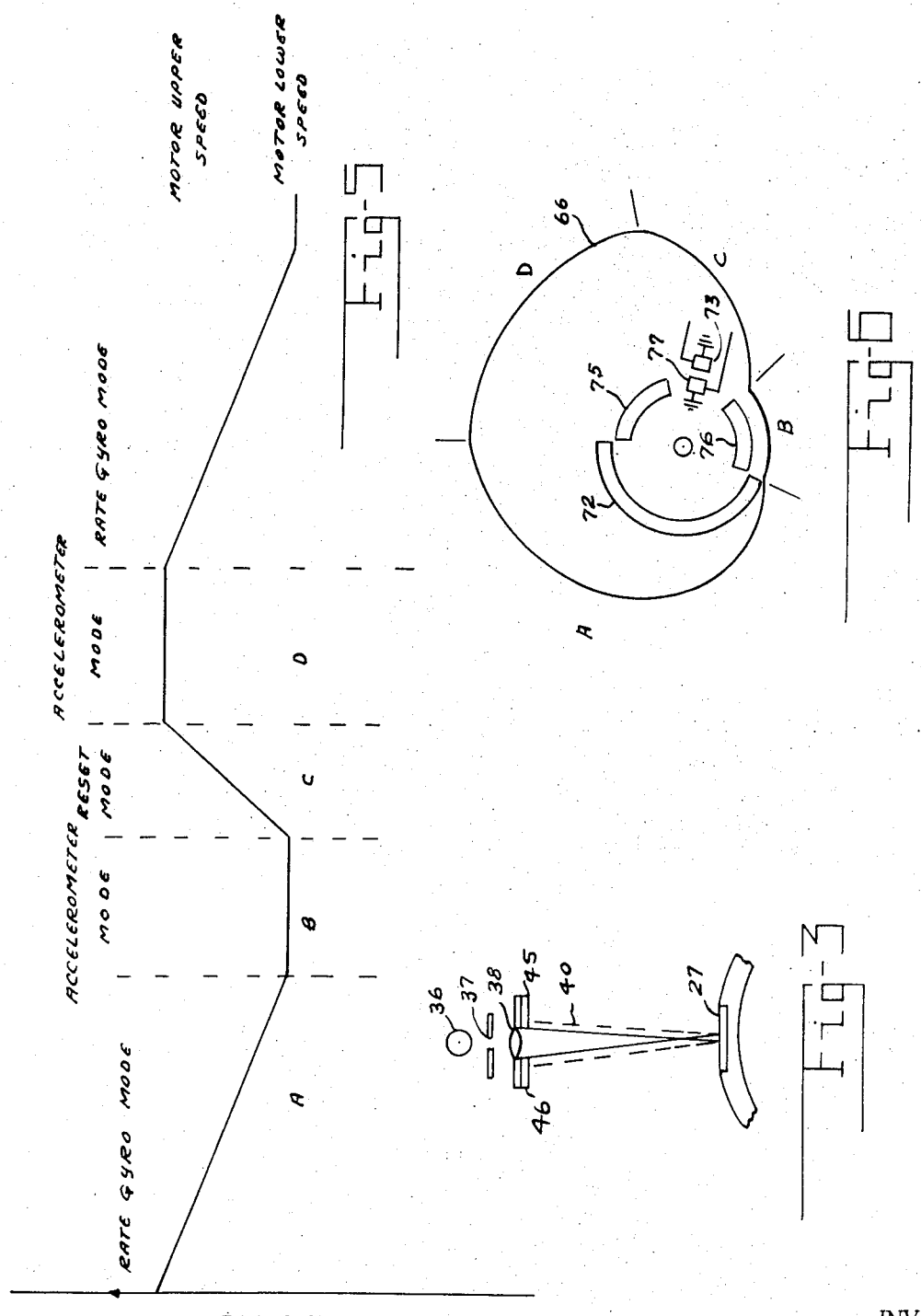

INVENTOR
GEORGE E. KNAUSENBERGER

DYNAMICALLY STABILIZED ACCELEROMETER AND RATE GYRO DEVICE

BACKGROUND OF THE INVENTION

Various types of suspension systems for gyroscope rotors have been devised. Gyro rotors have been supported by mechanical supports, such as bearings; by electrostatic means; with magnetic bearings; with air bearings and by a fluid within a chamber.

In systems using a fluid support, the weight of the liquid displaced by the rotor is greater than the weight of the rotor and the space within the chamber around the rotor is completely filled with liquid. In these devices, centrifugal forces maintain the rotor in the center of the cavity, since the liquid is heavier than the rotor. However, in such systems, the rotor is unstable in the axial direction. Mechanical means have been provided within the chamber to provide axial stability. One system suggested for maintaining axial stability is to provide two liquids of different density within the chamber. While this eliminates the need for mechanical support within the chamber, it presents other problems. With such a system, it is difficult to obtain equal distribution of the lighter liquid at the top and bottom of the rotor, which is needed for axial centering of the rotor. Also, there is a problem of mixing and bubbling of the liquids which promotes instability.

A system which overcomes these problems is described in German Pat. No. 1,448,566 published Nov. 14, 1968, but not yet patented. In this device, the rotor is dynamically stabilized by providing a difference in rotational speed between the rotor and the chamber enclosing the rotor. This is accomplished by constantly changing the speed of the chamber through a range of speeds. This device is described as capable of providing both rate gyro information and acceleration information. However, only optical means is provided for observing the rotor position.

There are certain problems with such a system when trying to obtain both rate gyro information signals and acceleration information signals from such a system. While movements of the rotor along the axis of rotation can be used to indicate acceleration, the changing speed of rotation has an effect on the acceleration information received from such a system.

BRIEF SUMMARY OF THE INVENTION

According to this invention, an optical system is provided wherein the illumination on four photoelectric devices is used to provide both acceleration information and rate gyro information. The acceleration information is obtained from a summing circuit connected to the four photoelectric devices and rate gyro information is obtained from difference circuits connected to photoelectric device positioned in opposite quadrants. The motor speed for driving the gyro is controlled by a cam which controls the frequency of a conventional oscillator. The cam also has cam surfaces for controlling switches which operate gates in the output of the summing and difference circuits.

In the drawings:

FIG. 3 shows one possible readout system for the device of FIG. 1.

FIG. 5 is a diagram showing the time sequence of the motor speed for the device of FIG. 1.

FIG. 6 shows one cam that can be used to control the oscillator frequency and switching for the device of FIG. 4.

DETAILED DESCRIPTION OF THE INVENTION

Figure 2:
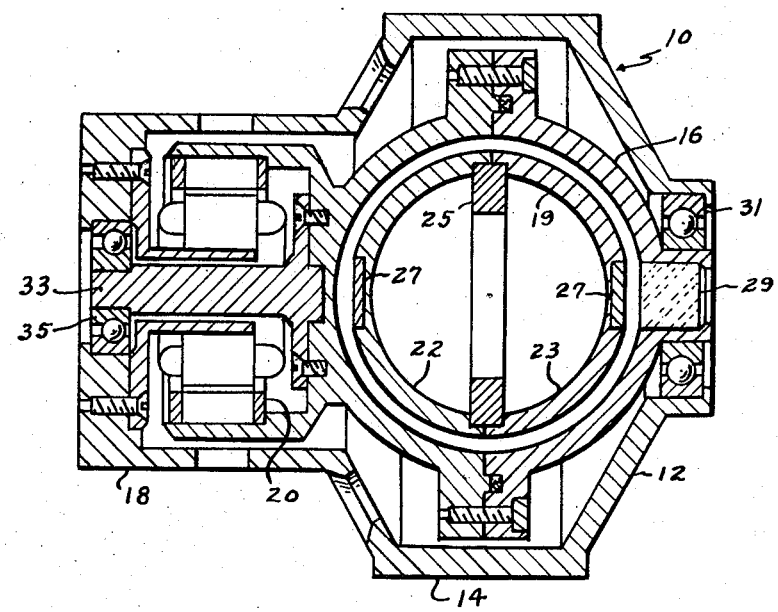
FIG. 2 is a sectional view of the gyroscope of FIG. 1 along the line 2—2.
Figure 1:
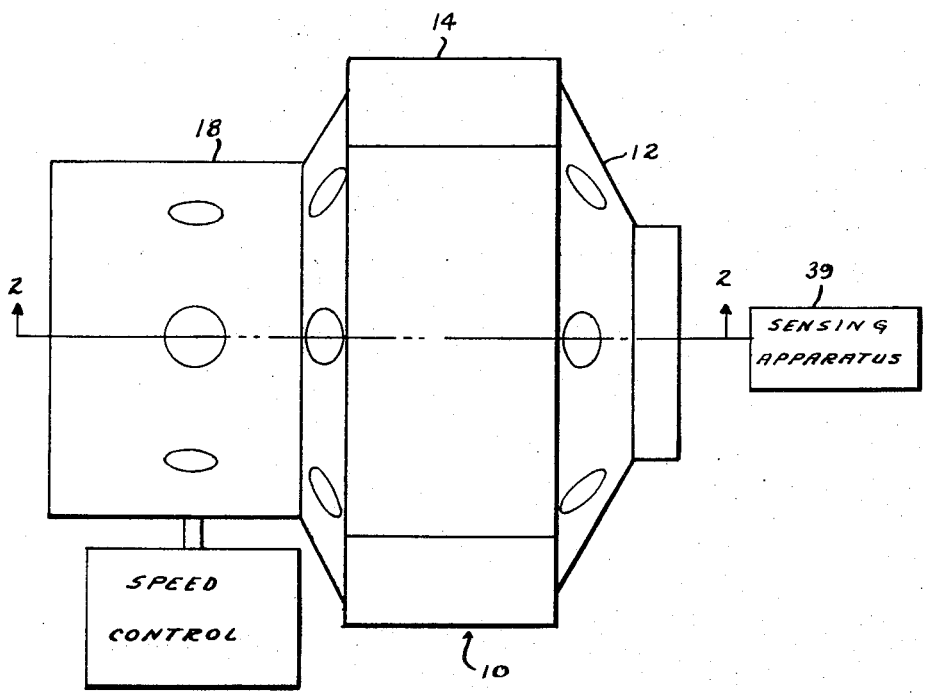
FIG. 1 is a side elevation view of a dynamically stabilized gyroscope according to the invention.

Reference is now made to FIGS. 1 and 2 of the drawing, which show a dynamically controlled gyroscope 10 having a housing 12 with a first section 14 enclosing a fluid filled chamber 16, and a second section 18 enclosing a chamber device motor 20.

The rotor 19, positioned within chamber 16, is made up of two semispherical sections 22 and 23 with a ring member 25 secured therebetween to fix the axis of rotation of the rotor in the same manner as in other fluid supported rotors. In the device constructed, the sections 22 and 23 were made of aluminum and the ring member 25 was made of steel.

Flat mirror elements 27 are secured at the ends of the rotor on the axis of rotation. Two mirrors are used, to provide balance in the rotor, though only one is used for sensing. A transparent window 29 is positioned in the wall of chamber 16 on the axis of rotation. Since either end of the rotor can be positioned adjacent window 29 during spin-up, with the two mirrors 27, an output can be obtained regardless of the position taken by the rotor. The space in chamber 16 around the rotor is filled with a high density liquid such as carbon hexafluoride $C_8F_{16}O$ or silicone oil.

One end of chamber 16 is supported in housing 12 by means of a bearing 31, with the shaft 33 connected to chamber 16 being supported in bearing 35. The chamber 16 is rotated in housing 12 by means of motor 20.

Figure 4:
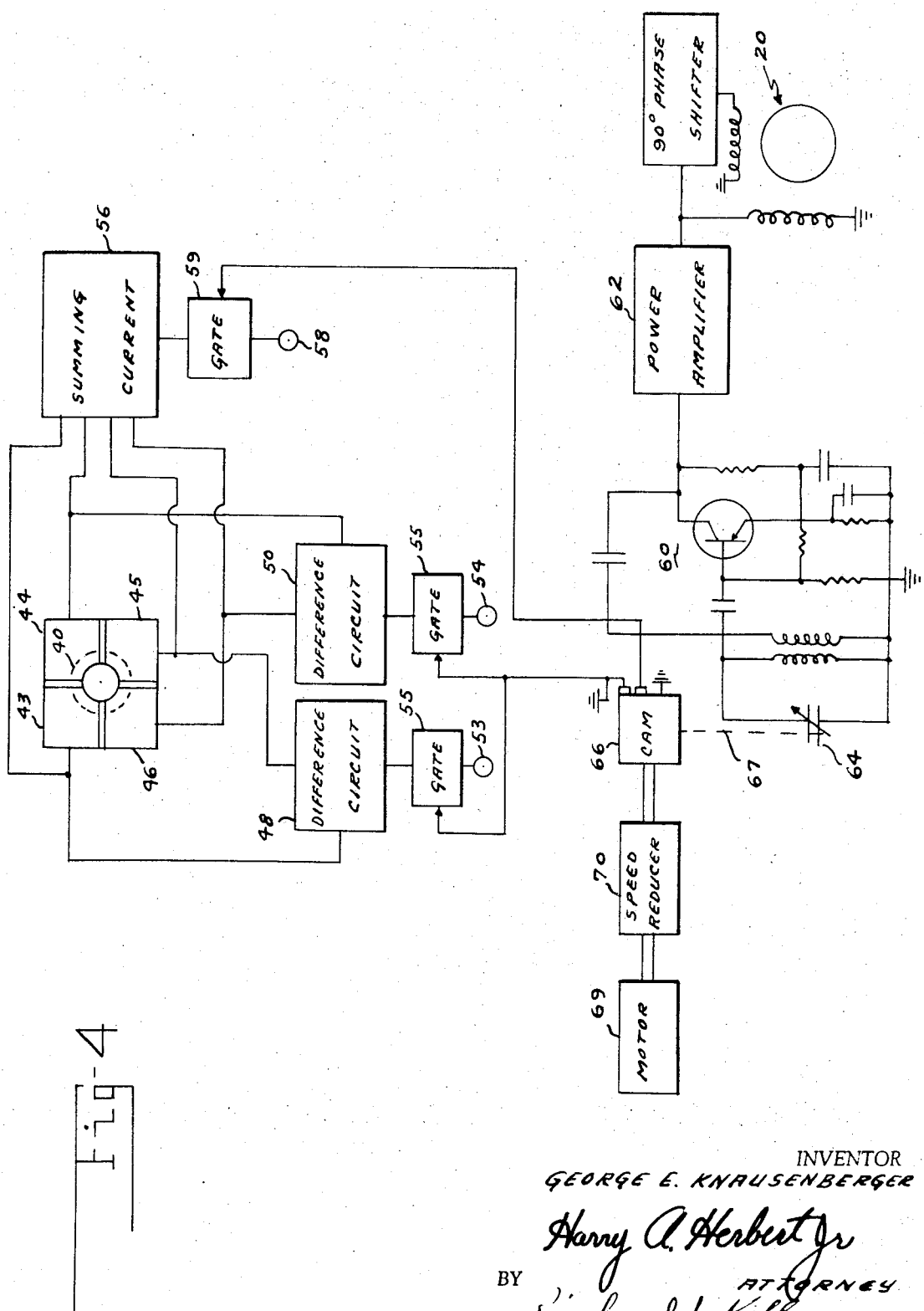
FIG. 4 is a schematic diagram partially in block form showing one possible readout and speed control system for the device of FIG. 1.

Light from source 36, in FIG. 3, passing through aperture 37, is brought to a focus by lens 38 in front of mirror 27 so that the return beam 40 illuminates photoelectric elements 43, 44, 45 and 46, as shown in FIG. 4. The outputs of elements 43 and 45 are fed to difference circuit 48, and the outputs of elements 44 and 46 are fed to difference circuit 50 to produce signals at outputs 53 and 54 which may be used to provide rate control signals, as in prior art gyro systems. The output of all of the photoelectric elements are connected to a summing circuit 56 and the output at 58 may be used to provide an acceleration signal. The rate gyro information, such as rate of pitch or roll, is obtained as the return beam 40 moves from the center position shown in FIG. 4. Acceleration of the gyro along the axis of rotation is determined by a change in spot size for the return beam 40. If the rotor moves toward the photoelectric elements, the spot size will decrease from the normal size with the rotor centered in chamber 16, if it moves away the spot size will increase from its normal size. An increase in spot size will cause a decrease in the illumination per unit area, but will provide an increase in the total illumination on the photoelectric elements.

The motor 20 may be swept through a range of speeds in the manner shown in FIG. 4. The motor 20 is driven by the output of a conventional oscillator 60 through a power amplifier 62. The frequency of oscillator 60 is changed by adjusting the variable capacitor 64 by means of a cam 66 and cam follower indicated schematically at 67. The cam 66 may be as shown in FIG. 6, with a first portion A for providing a decreasing speed for motor 20, a portion B for providing a constant lower speed, a portion C for providing a rapid increase in speed and a portion D for providing a constant higher speed. While cam 66 is shown as providing two periods of constant speed during each speed change cycle, either the period at the higher speed or the period at the lower speed could be eliminated with the other being made longer. A raised cam surface 72 on cam 66 operates switch 73 to close the gates 55 in the outputs of difference circuits 48 and 50 during the decreasing motor speed time A. The pair of raised cam surfaces 75 and 76 operate switch 77 to close the gate 59 in the output of summing circuit during the constant speed times B and D. The cam is driven by a motor 69 through a speed reducer 70. In one device built, the speed of the motor 20 was changed between 3,500 and 4,000 rpm at a rate of about 6 times per minute. Faster or slower rates for the speed changes can be provided, for example, cycles as slow as once every 6 minutes, may be desirable in some cases. At slower rates, more than one gyro system can be provided wherein the cams for controlling the different gyro motors are driven out of phase, for example, one gyro could be operating in the rate mode while another is operating in the accelerometer mode.

While a synchronous motor was used in tests, the speed of the chamber could also be changed by changing the field of a DC motor. Also, the speed of the chamber could be changed with the use of a mechanical speed change device.

There is thus provided an apparatus for obtaining rate gyro information and acceleration information from a gyroscope rotor, wherein axial stability is obtained by changing the relative speed of the rotor and rotor container.

I claim:

1. A gyro apparatus, comprising: a housing; a fluidtight chamber within said housing; a fluidtight substantially spherical rotor element within said chamber; a liquid within said chamber completely filling the space between the rotor and the chamber wall; said rotor having a weight which is less than the weight of the liquid displaced by said rotor; means for rotating said chamber within said housing; means for cyclically varying the speed of said chamber between predetermined limits, whereby the axial position of the rotor is stabilized; said means for varying the speed of the rotor including means for holding the speed of the rotor constant for at least one predetermined interval during each speed change cycle; means within said rotor for fixing the axis of rotation of said rotor; means responsive to changes in angular position of said rotor within the chamber for providing at least one rate output signal; means responsive to changes in the axial position of said rotor within the chamber for providing an axial acceleration output signal and means connected in the output of said axial acceleration signal means for providing an output only during the constant speed portion of each speed change cycle.

2. The device as recited in claim 1, wherein the means for continuously varying the speed of the chamber includes a synchronous motor for rotating the chamber; an AC source for driving the synchronous motor and means for controlling the frequency of said AC source.

3. The device as recited in claim 2, wherein said AC source includes a capacitor tuned oscillator; a cam; means for driving said cam at a predetermined speed; means responsive to said cam for varying said capacitor; said cam having a first cam surface for slowly decreasing the frequency of the oscillator, a second portion for holding the frequency of said oscillator constant at the lower speed, a third portion for rapidly increasing the frequency of said oscillator and a fourth portion for holding the frequency constant at the higher speed.

4. The device as recited in claim 3 including means in the output of said rate signal means for providing an output only during the slowly decreasing frequency portion of each speed change cycle; the means for providing outputs from the axial acceleration signal means and the rate signal means only during certain portions of the speed change cycles including gate devices in the outputs of the axial acceleration signal means and the rate signal means and means responsive to the cam position for closing said gates, to pass output signals through the gates.

* * * * *